March 2, 1943. B. W. CARRINGTON 2,312,798
SPEED COMPENSATING MEANS FOR PHONOGRAPH TURNTABLE DRIVES
Filed Nov. 13, 1941

INVENTOR.
Blake W. Carrington
BY
HIS ATTORNEY

Patented Mar. 2, 1943

2,312,798

UNITED STATES PATENT OFFICE 2,312,798

SPEED COMPENSATING MEANS FOR PHONOGRAPH TURNTABLE DRIVES

Blake W. Carrington, Elyria, Ohio, assignor to The General Industries Company, Elyria, Ohio, a corporation of Ohio Application November 13, 1941, Serial No. 418,870

4 Claims. (Cl. 74—206)

My invention relates to improvements in phonograph turntable drive and relates particularly to speed compensating means for the same.

It is an object of my invention to compensate for variations in drag upon the turntable which result in variations in the speed of the turntable.

Another object of my invention is to provide an improved construction of the type described which will be adapted for use in connection with turntables which are driven by means associated with the rim of the turntable.

Another object of my invention is to provide an improved mounting for a turntable motor and for turntable speed compensating means associated therewith.

Another object of my invention is to provide improved speed compensating means which may be associated with an idler wheel assembly for driving a phonograph turntable.

A further object of my invention is to provide a compensating turntable drive which will be inexpensive to manufacture, efficient in operation and durable in use.

Other objects of my invention and the invention itself will become more apparent by reference to the drawing accompanying the specification hereof in which drawing.

Figure 1:
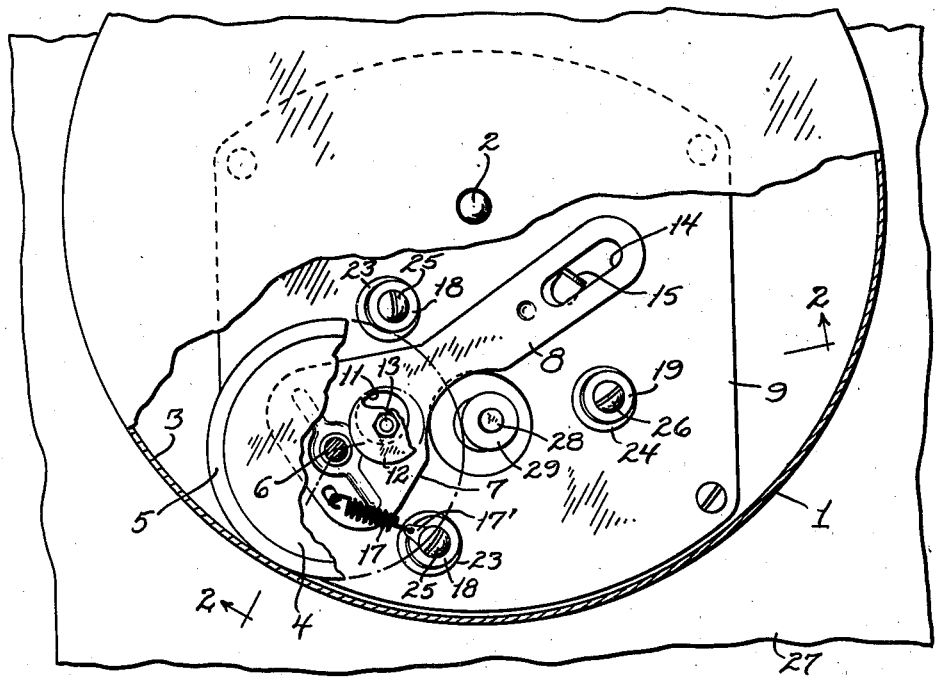
Fig. 1 is a top plan view of a portion of a turntable broken away to exhibit therebelow the turntable rim and motor spindle with which the idler wheel and speed compensating means of my invention are associated.

Referring now to the drawing, at 1 I show a phonograph turntable rotatably mounted on a turntable spindle 2, said turntable comprising a downwardly extending peripheral flange or rim portion 3 with which an idler wheel 4 is adapted to have frictional engagement by means of a rubber tire or friction tread 5 which is fitted peripherally about the idler wheel 4. The idler wheel is mounted to revolve about a stud 6 which is carried by an enlarged end 7 of a sliding arm 8, said sliding arm being, in turn, mounted upon a base plate 9 by means of a bolt 10 which is projected through an enlarged aperture 11 in the sliding arm.

A metallic disc or washer 12 is adapted to overlap such perforated portion of the arm and a pair of nuts 13 secure the disc in position. The perforation in the arm is considerably larger than the diameter of the bolt whereby the enlarged end portion of the arm may be shifted laterally within the limits of such perforation with respect to the base plate 9. Furthermore, longitudinal movement of the arm is permitted by reason of an enlarged elongated slot 14 disposed at the opposite end of said arm, a struck-up tongue 15 of the base plate projecting through the slot and restricting movement of the arm with respect to the plate as can readily be appreciated.

The sliding arm, however, constitutes no essential part of my invention and is utilized for the usual desired sliding movement of the idler wheel with the assistance of spring means 17 which is mounted on the enlarged end portion and secured to an ear 17' securely mounted upon the end of a relatively short post 18 which, together with a relatively longer post 19, is secured to the motor housing 20 to provide a tilted mounting for an electric phonograph motor 21 which may be of the usual induction type having a field core 22 and which is adapted to communicate power to the turntable to drive the same.

The motor 21 which is secured by means of the relatively different length rods 18 and 19 to the base plate 9 is in a tilted position with respect to the base plate 9 and the idler wheel and phonograph turntable assembly as is shown.

It is to be noted that the rods 18 and 19 are further provided with resilient means 23 and 24 which contact the base plate whereby the motor is resiliently mounted upon the base plate, the bolts 25 and 26 projecting through the base plate and through the resilient means 23 and 24 in such a manner so that there is no metal-to-metal contact between any motor supporting means and the base plate 9 which is secured to the platform 27 of a cabinet or other customary support for the phonograph.

Figure 2:
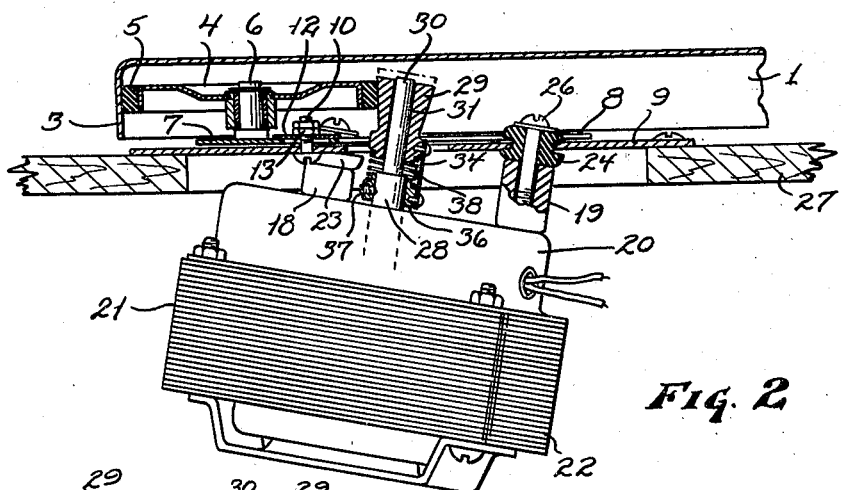
Fig. 2 is a sectional view taken on the line 2—2 of Fig. 1.

The motor shaft 28 which is operatively connected to the rotor of the motor is provided with a tapered friction pulley 29 longitudinally and rotatably movable with respect to the reduced end 30 of the shaft 28, said pulley being centrally bored as shown at 31 whereby the same may be telescoped over the end 30 of the shaft 28. The pulley is preferably provided, as illustrated, with a transversely disposed pin 32 projected through the skirted end 33 of the pulley and through a flexible band 34 secured, in turn, at its opposite end by a pin 35 to a sleeve 36 fixed upon the shaft 28, as by the set screw 37 illustrated in Fig. 2 herein.

A compression spring means 38 is preferably telescoped over the reduced portion 30 of the shaft 28, the uppermost convolution of said spring bearing against the skirt 33 and the lowermost convolution bearing against the upper surface of the sleeve 36.

In operation, the device of my invention automatically compensates for, or irons out, variations in drag upon the turntable so as to produce a constant speed of rotation. To accomplish this, the tapered pulley 29 moves up or down along the motor spindle so as to present a smaller or greater driving diameter to the idler wheel 4, and thus impart to it a lower or higher speed of rotation as may be required.

Figure 3:
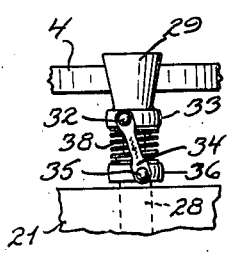
Fig. 3 is an elevational view of the motor spindle of Fig. 2.
Figure 4:
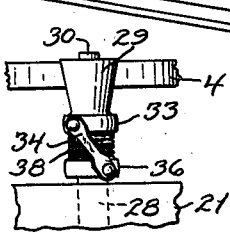
Fig. 4 is an elevational view of the motor spindle of Figs. 2 and 3 showing the speed compensating means of my invention in another operative position with reference to the idler wheel and the spindle illustrated in Fig. 3.

The pulley 29 is pulled around, in effect, by the band 34 and, were it not for the spring 38, it would be pulled downwardly to the sleeve 36 as the band assumed a more and more horizontal position due to the lag of the pulley behind the motor spindle. The spring, however, balances this downward tendency and the pulley, during normal operation, assumes some such position as that illustrated in solid lines in Fig. 2. Now, should the turntable tend to speed up, due, for instance, to a region in the record of reduced friction being encountered by the phonograph needle, the pulley 29 will tend to overrun the motor spindle and the compression spring 38 will raise the pulley to a position such as that of Fig. 3 and the dotted lines of Fig. 2. The decreased diameter now at the idler wheel level will tend to drive it and the turntable at a reduced speed and thus compensate for the abnormal condition. On the other hand, should there be a tendency for the turntable to slow down, due, for instance, to increased drag of the needle, the pulley 29 will lag behind the motor spindle causing the pulley to be lowered against the action of the spring 38 and thus present a greater driving diameter to the idler wheel, as in Fig. 4, and hence impart a higher speed to it and to the turntable to counteract the increased drag. Upon resumption of the proper speed, the compression spring 38 will raise the pulley again to its normal height.

The previously mentioned tilt of the motor and spindle is at such an angle that the idler wheel contacting region of the tapered pulley extends vertically, parallel to the axis of the wheel, so as to produce an efficient drive free of axial forces. It will be seen that the distance of the pulley 29 from the turntable rim 3 varies as the pulley slides up or down on the motor spindle. The slideable mounting of the idler spindle. The slideable mounting of the idler wheel 4, as previously described, allows the idler wheel to bridge this varying distance and the wheel is maintained in efficient driving contact with both the turntable rim 3 and the pulley 29 by the tension spring 17 and by the wedging action due to the directions of rotation.

It will be apparent that the particular embodiment of the invention here illustrated may be varied within wide limits and remain within the spirit and scope of this invention. For example, the spring band 34 is but a preferred arrangement and any other such limiting means such as a metal wire or the like might be used. Other changes and modifications might be made without departing from the spirit of my invention and the scope of the appended claims.

I claim:

1. In a mechanical movement, the friction gearing mechanism comprising a rotatable driven element, a driving roller and an intermediate roller having a peripheral frictional surface engageable at different points of its periphery with the said driven element and said driving roller, an idler shaft for said intermediate roller on which said intermediate roller is journalled for relative longitudinal rotative movements, and a driving shaft for said driving roller, the axes of said rollers being relatively inclined one to the other at an acute angle, said intermediate roller having a relatively narrow peripheral frictional surface and the driving roller having a relatively broader tapered frictional surface proceeding in the direction of its longitudinal axis, and longitudinally extending portions of said tapered surface being inclined to said axis at an acute angle approximately corresponding to the said angle of inclination of said roller axes, flexible driving connection means between points on said driving roller and said driving roller shaft which points are disposed substantially laterally of said driving roller axis, and means yieldably exerting pressure on said driving roller tending to move it axially on its shaft in the direction of the portion in which the diameter of its tapered surface is increased to effect frictional engagement between said intermediate roller and said driving roller tapered surface which is of relatively lesser diameter and said flexible means variably limiting the effect of said pressure means on said driving roller according to varying loads imposed on said rotatable driven element in creating varying torque effects between said driven and driving rollers.

2. In a mechanical movement, the friction gearing comprising an intermediate friction wheel, a driving roller therefor and a driven rotor in driven engagement with the periphery of said wheel, said driving roller having outer longitudinally tapered driving surface motor and a motor shaft, said driving roller loosely mounted on said shaft for relative longitudinal and rotative movement with respect thereto, spring means urging said driving roller in the direction of its portion of increased diameters and flexible shaft and roller connecting means connecting said shaft to a point on said roller disposed laterally of its axis, said spring means tending to move said roller on its shaft longitudinally thereof to a maximum extent when the mechanism is idle, the position of the driving roller on its driving shaft varying according to the load imposed upon said driving roller by the reactive load effect communicated thereto by said driven element through said intermediate roller.

3. A phonograph turntable drive including a turntable rim drive element, a tapered pulley disposed in driving engagement with said rim element, said pulley being mounted upon a motor shaft of a driving motor, which motor shaft is disposed at an angle to said turntable whereby the rim engaging portion of said tapered pulley which is rotatably mounted on said motor shaft extends vertically parallel to the axis of said rim element to effect a drive free of axial forces, a flexible band secured to said pulley and to a sleeve member rigidly secured to the lower end portion of said shaft, spring means interposed between said pulley and said sleeve member and telescoped over said shaft, said spring limiting the downward movement and the band limiting upward movement of said pulley.

4. A phonograph turntable drive including a turntable rim drive element, a driving roller, said rim drive element having a peripheral friction surface engageable at different points of its periphery with said turntable rim and said driving roller, an idler shaft for said rim drive element on which said element is journalled for relative longitudinal rotative movement and a driving shaft for said driving roller, the axes of said roller and rim drive element being relatively inclined one to the other at an acute angle, said rim drive element having a relatively narrow peripheral frictional surface and the driving roller having a relatively broader tapered frictional surface proceeding in the direction of its longitudinal axis, longitudinally extending portions of said tapered surface being inclined to said axis at an acute angle approximately corresponding to the said angle of inclination of said roller and rim drive element, means yieldably exerting pressure on said driving roller tending to move it axially on its shaft in the direction of its portion of increased diameter to effect frictional engagement between said rim drive element and said driving roller tapered surface which is of relatively lesser diameter, flexible means disposed between said tapered frictional surface of said driving roller and said driving roller shaft variably limiting the effect of said pressure means on said driving roller according to varying loads imposed on said turntable.

BLAKE W. CARRINGTON.